(12) United States Patent
Mikajiri (10) Patent No.: US 8,400,686 B2
(45) Date of Patent: Mar. 19, 2013

(54) OPTICAL SCANNING DEVICE AND IMAGE FORMING APPARATUS INCLUDING SAME

(75) Inventor: Susumu Mikajiri, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 423 days.

(21) Appl. No.: 12/716,945

(22) Filed: Mar. 3, 2010

(65) Prior Publication Data

US 2010/0231816 A1    Sep. 16, 2010

(30) Foreign Application Priority Data

Mar. 11, 2009  (JP) .................................. 2009-057678

(51) Int. Cl.
    *H04N 1/04* (2006.01)
(52) U.S. Cl. ........ 358/474; 358/481; 358/484; 358/486; 399/297; 349/2
(58) Field of Classification Search .................. 358/474, 358/484, 487, 501, 475, 509, 481, 490; 349/8, 349/194, 2, 5; 353/20, 31, 33, 81; 399/297
    See application file for complete search history.

(56) References Cited

U.S. PATENT DOCUMENTS

| | | | | | |
|---|---|---|---|---|---|
| 5,797,050 | A | * | 8/1998 | Smith | 396/241 |
| 6,988,804 | B2 | * | 1/2006 | Notagashira | 353/20 |
| 7,604,351 | B2 | * | 10/2009 | Fukuma et al. | 351/206 |
| 7,817,313 | B2 | * | 10/2010 | Mikajiri | 358/497 |
| 7,826,109 | B2 | * | 11/2010 | Ikeno et al. | 358/498 |
| 7,924,474 | B2 | * | 4/2011 | Itoh | 358/474 |
| 8,070,297 | B2 | * | 12/2011 | Kamijima | 353/69 |
| 8,113,660 | B1 | * | 2/2012 | Troyer | 353/31 |
| 8,130,423 | B2 | * | 3/2012 | Nakano et al. | 358/474 |
| 8,152,303 | B2 | * | 4/2012 | DeCusatis et al. | 353/8 |
| 8,177,369 | B2 | * | 5/2012 | Kaise | 353/31 |

FOREIGN PATENT DOCUMENTS

| | | |
|---|---|---|
| JP | 5-19190 A | 1/1993 |
| JP | 9-131920 A | 5/1997 |
| JP | 2001-183628 A | 7/2001 |
| JP | 2002-350769 A | 12/2002 |
| JP | 2003-196878 A | 7/2003 |
| JP | 2004-174720 A | 6/2004 |
| JP | 3638766 B2 | 1/2005 |
| JP | 3647723 B2 | 2/2005 |
| JP | 2005-215313 A | 8/2005 |
| JP | 2007-102107 A | 4/2007 |
| JP | 3984049 B2 | 7/2007 |
| JP | 4180496 B2 | 9/2008 |

* cited by examiner

*Primary Examiner* — Negussie Worku
(74) *Attorney, Agent, or Firm* — Dickstein Shapiro LLP (57) ABSTRACT

An optical scanning device includes a light source, an optical system, and a housing. The light source projects a light beam. The housing includes a holder and encloses the optical system. The optical system includes a liquid crystal element held by the housing via the holder, to modulate a phase of the light beam projected from the light source against a scanned surface. The liquid crystal element includes a plurality of substantially transparent substrates, a liquid crystal layer, and a sealing member. One of the plurality of the transparent substrates has a size larger than any other transparent substrates and is positioned in the holder. The liquid crystal layer is sandwiched between the plurality of substantially transparent substrates. The sealing member seals the liquid crystal layer between the plurality of substantially transparent substrates.

9 Claims, 7 Drawing Sheets

RECTANGULAR WAVE, 1-10 [KHz]

OPTICAL SCANNING DEVICE AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application No. 2009-057678, filed on Mar. 11, 2009 in the Japan Patent Office, which is hereby incorporated herein by reference in its entirety.

BACKGROUND OF THE INVENTION

1. Field of the Invention

Exemplary aspects of the present invention generally relate to an optical scanning device and an image forming apparatus such as a digital multi-functional system, and more particularly, to an image forming apparatus including the optical scanning device.

2. Description of the Background Art

With an image forming apparatus, for example a digital copier or the like, there is growing market demand for production of images of ever-higher quality at ever-higher speeds.

In order to achieve the necessary speed and quality, an optical scanning device using multiple beams is known to be effective. Such an optical scanning device requires adjustment of the beam pitch (scan line pitch) between the plurality of laser beams. Known pitch adjustment methods include a method of rotating a multi-beam light source unit about an optical axis and a method using a dedicated optical element to adjust the beam pitch.

However, a drawback to rotating the multi-beam light source unit about the optical axis is that reliable rotation of the light source unit becomes a critical factor. In order to achieve superior image quality, the pitch of each beam needs to be narrowed to provide the necessary density, thereby complicating adjustment.

By contrast, use of the dedicated optical element to adjust the beam pitch necessitates use of a highly-accurate optical element made of glass, resulting in a cost increase.

Moreover, as noted above, to achieve high imaging quality, it is necessary to reduce the diameter of the beam spot in order to increase the number of spots per unit area (resulting in greater image density). Yet even if the diameter of the beam spot is adjusted with precision initially, unintended shifting may occur over time due to fluctuations in ambient temperature, for example.

In order to adjust the beam pitch, a liquid crystal element that is driven by an electric signal is used. The liquid crystal element is advantageous in that it is compact (light weight), driven with low voltage, and generates no heat, noise, or vibration.

Generally, such a liquid crystal element includes a layer formed of a liquid crystal having a thickness ranging from a few micrometers [μm] to several tens of micrometers [μm] sandwiched between two glass substrates. The edges of the glass substrates are sealed with a sealing member. This configuration is known as a cell structure. With this configuration, when the surrounding temperature changes, in particular, when the temperature in the atmosphere increases, the liquid crystal layer undergoes thermal expansion, causing a center portion of the crystal element to swell and thus causing the glass substrate to deform. As a result, a lens effect (positive power) is induced. If such a liquid crystal element is employed in the optical scanning device or the like, the position of the beam waist changes undesirably, thereby degrading the precision of the beam spot diameter (the beam spot diameter increases).

Methods of fixing the liquid crystal element have been proposed. One example of a related-art fixing method of the liquid crystal element includes fixing the liquid crystal element to a holder/support member by applying an adhesive agent at a plurality of places along the periphery of the liquid crystal element.

A drawback to this approach is that changes in the temperature inside the image forming apparatus affect the amounts of thermal expansion of the liquid crystal element (that is, the glass substrate) and of the holder differently. Due to the difference in thermal expansion of the liquid crystal element and the holder, the liquid crystal element deforms, degrading optical characteristics such as wavefront aberration of the transmitted optical beam.

Furthermore, in the related-art approach, the liquid crystal element is adhered to a housing using the adhesive agent to protect the liquid crystal element from damage, and the related-art holder/support member does not include an opening for shaping the beam.

Furthermore, when the liquid crystal element is held by or fixed to the holder by pressing the sealed portion by a spring or the like, the glass substrate deforms, thereby causing localized degradation of parallelism of the thickness of the liquid crystal layer. As a result, the optical characteristics described above, such as wavefront aberration of the transmitted optical beam, are also degraded.

SUMMARY OF THE INVENTION

In view of the foregoing, in one illustrative embodiment of the present invention, an optical scanning device includes a light source, an optical system, and a housing. The light source projects a light beam. The housing includes a holder and encloses the optical system. The optical system includes a liquid crystal element held by the housing via the holder, to modulate a phase of the light beam projected from the light source against a scanned surface. The liquid crystal element includes a plurality of substantially transparent substrates, a liquid crystal layer, and a sealing member. One of the plurality of the transparent substrates has a size larger than any other transparent substrates and is positioned in the holder. The liquid crystal layer is sandwiched between the plurality of substantially transparent substrates. The sealing member seals the liquid crystal layer between the plurality of substantially transparent substrates.

In another illustrative embodiment of the present invention, an image forming apparatus includes an image bearing member, a developing device, a transfer device, a fixing device, and an optical scanning device. The image bearing member bears an electrostatic latent image on a surface thereof. The developing device develops the electrostatic latent image formed on the image bearing member using toner to form a toner image. The transfer device transfers the toner image onto a recording medium. The fixing device fixes the toner image. The optical scanning device exposes the image bearing member to form the electrostatic latent image thereon. The optical scanning device includes a light source to project a light beam, an optical system, and a housing, including a holder, to enclose the optical system. The optical system includes a liquid crystal element held by the housing via the holder, to modulate a phase of the light beam projected from the light source against a scanned surface. The liquid crystal element includes a plurality of substantially transparent substrates, a liquid crystal layer, and a sealing member. One of the plurality of the transparent substrates has a size larger than any other transparent substrates and is positioned in the holder. The liquid crystal layer is sandwiched between the plurality of substantially transparent substrates. The sealing member seals the liquid crystal layer between the plurality of substantially transparent substrates.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 10:
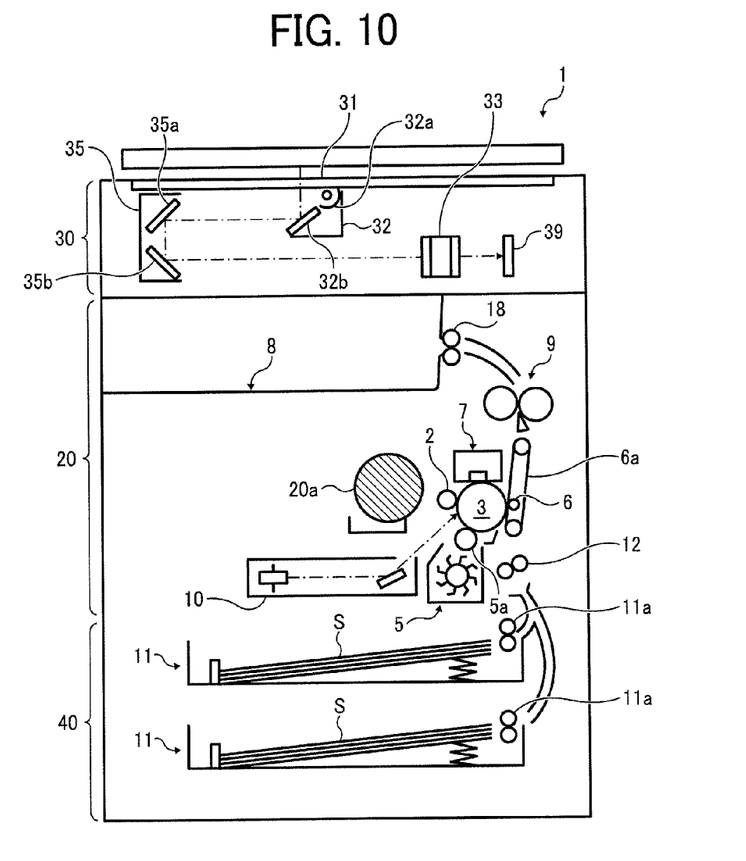
FIG. 10 is a cross-sectional schematic view of an image forming apparatus according to an illustrative embodiment of the present invention.

Referring now to the drawings, wherein like reference numerals designate identical or corresponding parts throughout the several views, and initially to FIG. 10, one example of an image forming apparatus according to an illustrative embodiment of the present invention is described.

Referring now to FIG. 10, there is provided a cross-sectional schematic view of the image forming apparatus 1 according to the illustrative embodiment.

In FIG. 10, the image forming apparatus 1 includes an image forming station 20 that includes a photoreceptor drum 3, a charging device 2, a developing device 5, a cleaning device 7, an optical scanning device 10, a transfer conveyance belt 6a, a transfer roller 6, a toner bottle 20a and so forth.

The photoreceptor drum 3 serves as an image bearing member. The cleaning device 7 cleans the photoreceptor drum 3. The optical scanning device 10 writes an electrostatic latent image formed on the photoreceptor drum 3. The transfer roller 6 is disposed facing the photoreceptor drum 3 through the transfer conveyance belt 6a, thereby defining a transfer nip therebetween. The toner bottle 20a stores toner to be supplied to the developing device 5 that consumes the toner.

Substantially below the image forming station 20, a sheet feeding unit 40 is disposed. The sheet feeding unit 40 includes sheet feed cassettes 11 provided with sheet feed rollers 11a. The sheet feed cassettes 11 store a stack of recording media sheets S. The sheet feed roller 11a picks up and feeds the recording medium S one sheet at a time. The recording medium S fed by the sheet feed roller 11a is halted temporarily at a position of a pair of the registration rollers 12 before the photoreceptor drum 3. Subsequently, the recording medium is sent to the transfer nip in synchronous with rotation of the photoreceptor drum 3 in appropriate timing such that the recording medium P is aligned with the image formed on the photoreceptor drum 3.

Substantially above the image forming station 20, a fixing device 9 serving as a fixing mechanism is disposed. The fixing device 9 includes two rollers that rotate while contacting each other through a sheet conveyance path for the recording medium S. At the downstream side of the sheet conveyance direction of the fixing device 9, a sheet discharge roller 18 is provided to discharge the recording medium S passed through the fixing nip onto a sheet discharge tray 8.

Substantially above the image forming station 20, a reading unit 30 is provided to read a document placed on a contact glass 31. The reading unit 30 includes a first carriage 32 including a light source 32a that illuminates the document and a first mirror 32b, and a second carriage 35 including a second mirror 35a and a third mirror 35b.

Image information of the document scanned by the first carriage 32 and the second carriage 35 is read as an image signal into a CCD 39 provided behind a lens 33. The read image signal is digitized and subjected to image processing. Based on the signal, a light source of the later-described optical scanning device 10 illuminates the surface of the photoreceptor drum 3 with light and scans the surface of the photoreceptor drum 3. Accordingly, an electrostatic latent image is formed on the surface of the photoreceptor drum 3.

Next, a description is provided of an image forming operation. In the image forming apparatus 1, the charging device 2 charges uniformly the photoreceptor drum 3 while the photoreceptor drum 3 rotates. Next, the optical scanning device 10 is driven based on the image information input from outside, thereby forming the electrostatic latent image in the charged area (image forming area) of the photoreceptor drum 3. The electrostatic latent image is developed with a developing agent, that is, toner, supplied from a developing roller 5a of the developing device 5, thereby forming a visible image also known as a toner image.

While the toner image is formed on the photoreceptor drum 3, the recording medium S is picked up by the sheet feed roller 11a of one of the plurality of the sheet feed cassettes 11. The leading edge of the recording medium abuts a nip portion between the registration rollers 12 and stops temporarily. The recording medium S is fed to the transfer nip between the photoreceptor drum 3 and the transfer roller 6 in appropriate timing such that the toner image on the photoreceptor drum 3 is aligned with the recording medium S.

After the toner image on the photoreceptor drum 3 is transferred onto the recording medium S in the transfer nip, a charge neutralizing brush, not illustrated, contacts the recording medium S, thereby removing charge on the recording medium S. Then, the recording medium S is separated from the photoreceptor drum 3 and sent to the fixing device 9.

The two rollers of the fixing device 9 sandwich the recording medium S therebetween, thereby heating and pressing the toner image. Accordingly, the toner image is fixed on the recording medium S. After the toner image is fixed on the recording medium S, the recording medium S is discharged onto the sheet discharge tray 8 by the discharge roller 18.

Toner remaining on the photoreceptor drum 3 (residual toner) even after the recording medium passed through the transfer nip is removed and recovered by the cleaning device 7.

The foregoing description pertains to a copier as one example of an image forming apparatus in which image information of the document placed on the contact glass 31 is read by the reading unit 30. However, the image forming apparatus is not limited to a copier. The image forming apparatus includes, but is not limited to, a printer in which an image is formed based on image information that is input from an external electronic device, for example, a personal computer.

Figure 1:
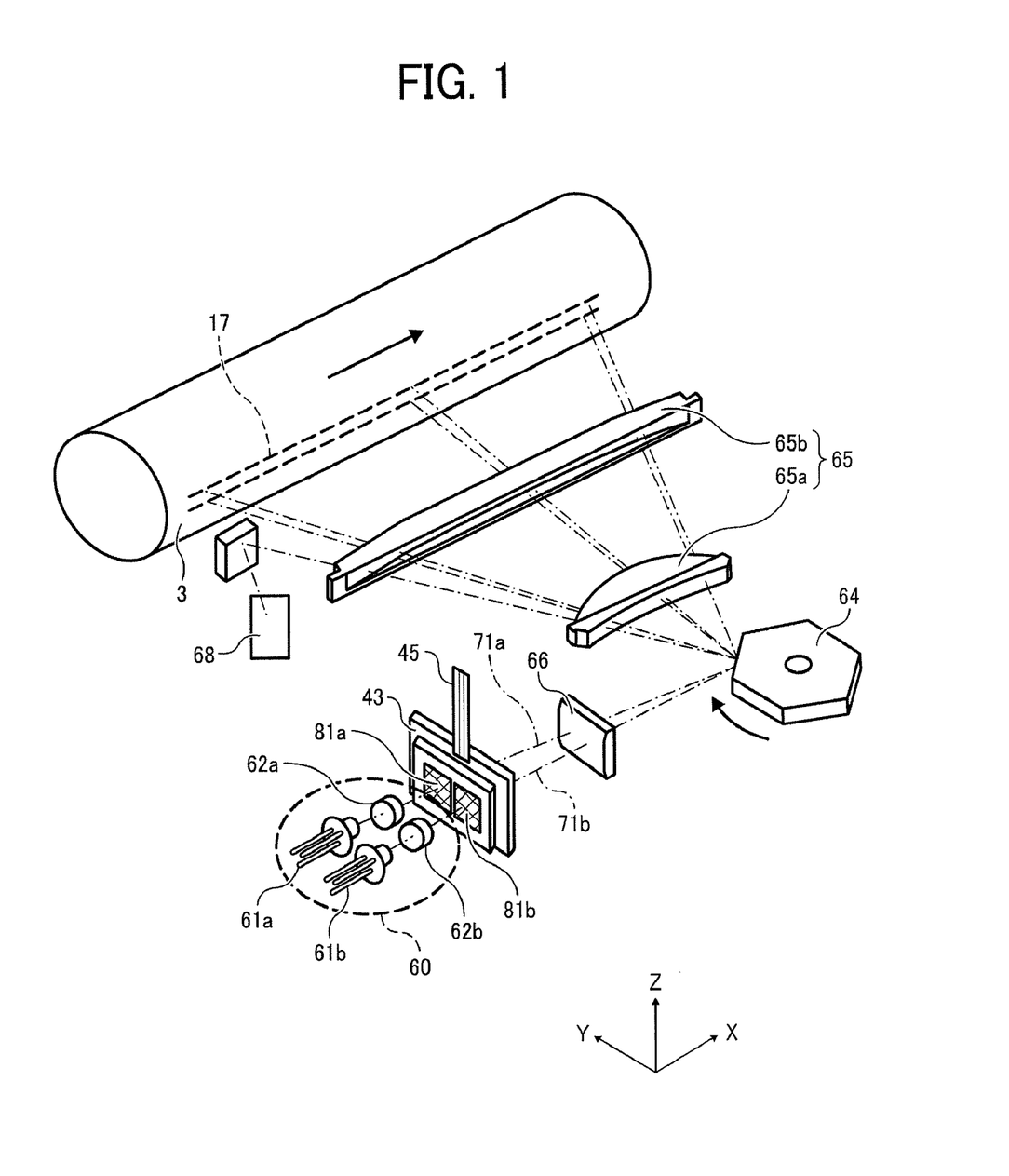
FIG. 1 is a perspective schematic view of an optical scanning device according to an illustrative embodiment of the present invention.

Referring now to FIG. 1, there is provided a perspective schematic view of an example of the optical scanning device employed in the image forming apparatus 1 described above.

The optical scanning device 10 includes two laser diodes 61a and 61b, each of which projects a laser beam onto a scan surface. This is known as a "double-laser beam optical scanning device". Alternatively, a laser diode array having a plurality of luminous points may be employed in stead of the laser diodes 61a and 61b. Still alternatively, the optical scanning device 10 may be a multi-beam optical scanning device including a plurality of laser diodes (having at least three laser diodes).

Laser beams 71a and 71b emitted from the laser diodes 61a and 61b, respectively, coupled by coupling lenses 62a and 62b are imaged as a line image on a reflection surface of a polygon mirror 64 serving as a deflector through a cylindrical lens 66. The line image is formed in a sub-scanning direction and long in a main scanning direction. Using the scan optical system 65, the laser beams scan over the surface of the photoreceptor drum 3 as a beam spot spaced at a certain pitch in both the main scanning direction and the sub-scanning direction. The scan optical system 65 includes a first scan lens 65a and a second scan lens 65b. A reference numeral 17 indicates scan lines.

The optical scanning device 10 includes also a synchronous detector 68, a liquid crystal element 43, effective areas 81a and 81b of the liquid crystal element 43, a Flexible Printed Circuit 45 (hereinafter referred to as FPC), and a fastening screw 46 (shown in FIG. 3), and so forth. It is to be noted that in stead of using FPC 45, a harness can be used.

Figure 2:
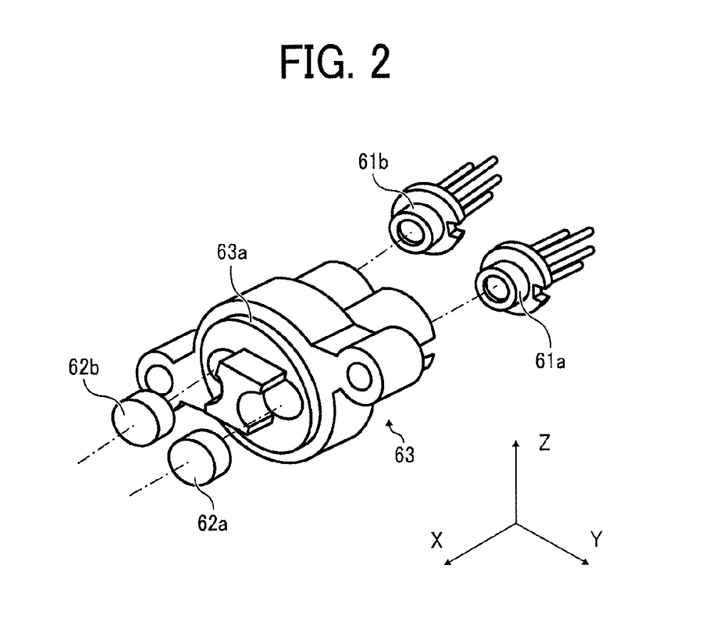
FIG. 2 is a perspective schematic view of a light source unit of the optical scanning device of FIG. 1.

Referring now to FIG. 2, there is provided a perspective schematic view of a light source unit 60 of the optical scanning device 10. In the light source unit 60, the laser diodes 61a and 61b, and the coupling lenses 62a and 62b are adhered and pressed fitted to a base member 63 so that the laser diodes 61a and 61b, and the coupling lenses 62a and 62b are integrally held by the base member 63.

The light source unit 60 is rotatably adjustable about a rotary shaft that is substantially parallel to the optical axis of the laser beams 71a and 71b. With this configuration, the beam spot pitch on the photoreceptor drum 3 in the sub-scanning direction, that is, a scan line pitch, can be adjusted to a predetermined value.

Figure 3:
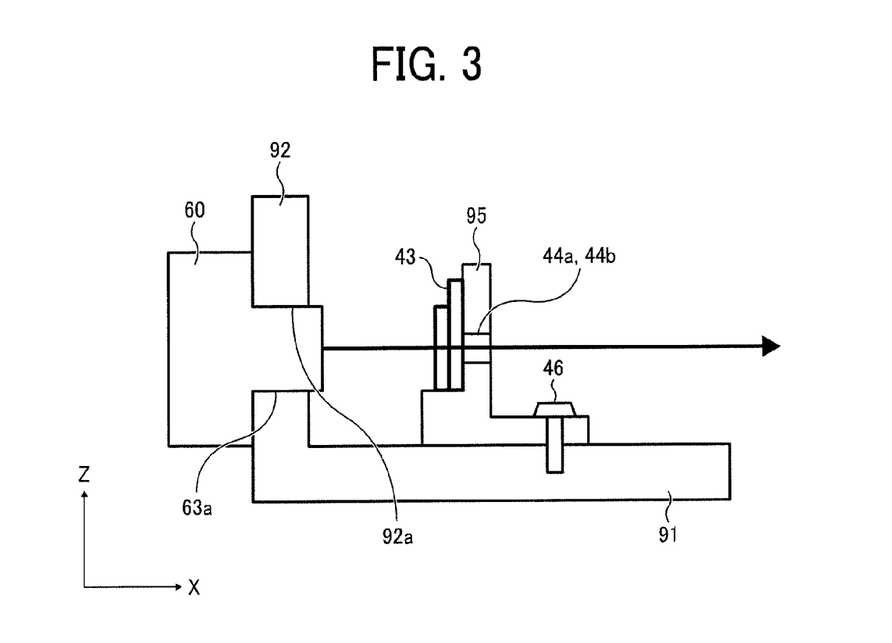
FIG. 3 is a cross-sectional schematic view of a holding mechanism for the light source unit of FIG. 2.

As illustrated in FIG. 3, the light source unit 60 is held such that a cylinder portion 63a provided to the base member 63 is fitted into a through whole 92a formed on a side wall 92 of an optical housing 91 and rotatably adjusted about the rotary shaft as described above. After adjustment, the light source unit 60 is held by a fastening screw, a spring, or the like. Furthermore, the light paths of the laser beams 71a and 71b are deflected at a fine angle by the liquid crystal element 43, thereby finely adjusting the pitch of the scan lines.

Based on a synchronous detection signal obtained when the laser beam enters the synchronous detector 68, start timing of writing in the main scanning direction is determined. In general, each optical element described above is enclosed in the housing (optical housing) 91. In the optical scanning device 10 the light beam projected from the light source as a beam spot scans over the photoreceptor drum 3.

Next, a description is provided of the liquid crystal element 43. The liquid crystal element 43 is provided with two effective areas 81a and 81b corresponding to the laser beams 71a and 71*b*, respectively. The effective areas 81*a* and 81*b* refer to areas that are driven by an electronic signal input from an external device via the FPC 45 or the like and modulate the phase of the incident laser beams.

According to the illustrative embodiment, the effective areas 81*a* and 81*b* are operable independently. An electrode pattern such as disclosed in JP2003-233094A, for example, is formed on the effective areas 81*a* and 81*b*. In the present embodiment, the electrode pattern is formed such that the light paths of the laser beams can be deflected in the sub-scanning direction (Z-direction). In other words, the electrode pattern is formed to generate an electric potential gradient in the sub-scanning direction.

The light paths of the laser beams 71*a* and 71*b* (in the sub-scanning direction) are deflected to directions opposite to one another by the effective areas 81*a* and 81*b*. Accordingly, the scan line pitch on the surface of the photoreceptor drum 3 can be adjusted.

The liquid crystal element 43 can be employed at the initial adjustment of the scan line pitch during assembly, correction of the scan line pitch due to changes over time/temperature change, or when changing the scan density, for example, switching between 600 dpi and 1200 dpi.

With reference to FIGS. 2 and 3, a description is now provided of fixation of the liquid crystal element 43 to a holder 95. FIG. 2 is a cross-sectional schematic view of the light source unit 60 of the optical scanning device 10. FIG. 3 is a cross-sectional schematic view of a holding mechanism for the light source unit 60.

In FIG. 3, the holder 95 includes apertures (openings) 44*a* and 44*b*. The apertures 44*a* and 44*b* shape the laser beams 71*a* and 71*b* into a desired beam shape. The apertures 44*a* and 44*b* may be formed in a sheet metal, for example, stainless steel, through pressure molding and assembled in the holder 95. However, the apertures 44*a* and 44*b* are not limited to the above described example.

The holder 95, the liquid crystal element 43, and the apertures 44*a* and 44*b* are integrated and fixed to the optical housing 91 using a fastening screws or any other suitable material. It is to be noted that it is important to keep a relative positional relation between the light source unit 60 (the laser beams 71*a* and 71*b*), the apertures 44*a* and 44*b*, and the liquid crystal element 43 (the effective area 81*a* and 81*b*) with high precision.

In general, the optical housing is formed through aluminum die casting, molding, and so forth. Due to characteristics of die-casting and molding, it is difficult to form complicated shapes. In view of this, the holder 95 and the optical housing 91 constitute independent members, thereby facilitating manufacture and shaping the optical housing, that is, the mold structure. With this configuration, manufacturing cost can be reduced, and molding process can be enhanced.

Figure 4:
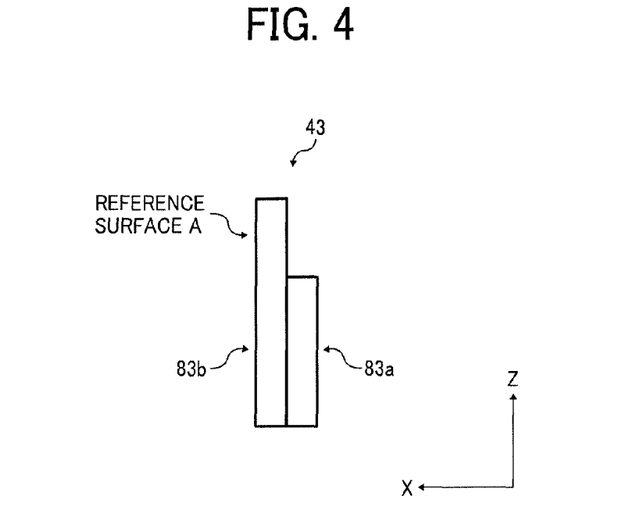
FIG. 4 is a cross-sectional schematic view of one example of a liquid crystal element employed in the optical scanning device according to the illustrative embodiment.
Figure 5:
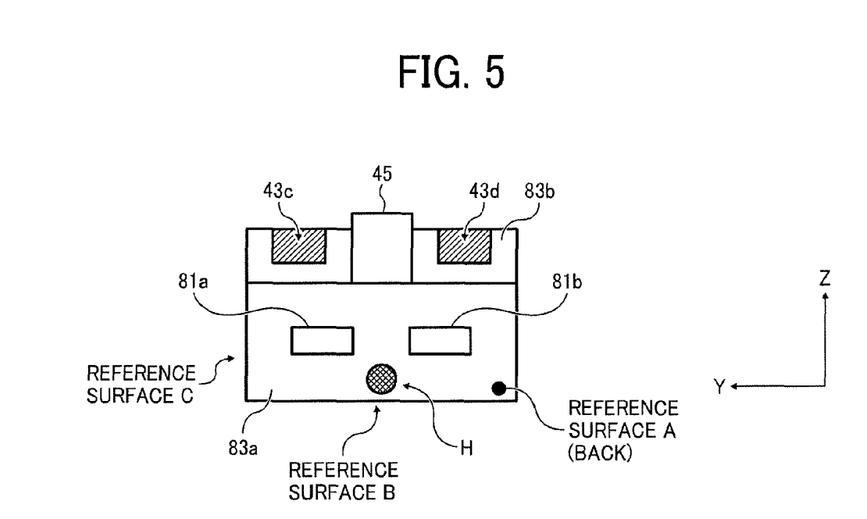
FIG. 5 is a front schematic view of the liquid crystal element of FIG. 4.
Figure 6:
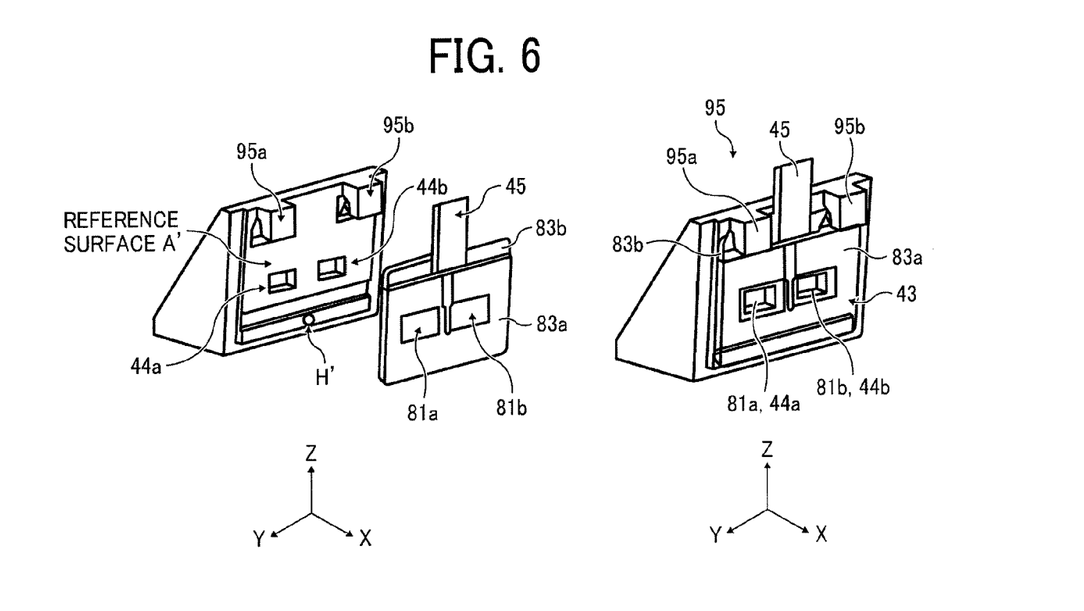
FIG. 6 is a perspective schematic view of a holding mechanism for the liquid crystal element according to the illustrative embodiment.

With reference to FIGS. 4 through 6, a description is provided of a positioning method of the liquid crystal element 43 relative to the holder 95. FIG. 4 is a cross-sectional schematic view of one example of the liquid crystal element 43 employed in the optical scanning device 10 according to the illustrative embodiment. FIG. 5 illustrates a rear side of the liquid crystal element 43 of FIG. 4. FIG. 6 is a perspective schematic view of a holding mechanism for the liquid crystal element 43.

According to the illustrative embodiment, the liquid crystal element 43 is fixed to the holder 95 using an adhesive. As illustrated in FIG. 4, the liquid crystal element 43 includes glass substrates 83*b* and 83*a*. In order to regulate positional accuracy of the glass substrates 83*b* and 83*a* relative to the effective areas 81*a* and 81*b*, reference surfaces A through C are provided to the liquid crystal element 43 as illustrated in FIG. 5. The reference surface A refers to a surface of the liquid crystal element at +Z side that contacts the holder. The reference surface B refers to a surface at −Z side (cutting plane). The reference surface C refers to a surface at +Y side (cutting plane).

In FIG. 5, stopper regulation areas corresponding to stopper portions 95*a* and 95*b* are indicated as 43*c* and 43*d*. An adhesive application area H of the liquid crystal element 43 is adhered to an adhesive application area H' of the holder. The adhesive is applied to the adhesive application area H' of the holder. However, alternatively, the adhesive is applied to the liquid crystal element 43. It is to be noted the same reference numerals used in FIG. 5 are provided to the similar or the same constituent elements in FIG. 11 and the description thereof will be omitted, when discrimination therebetween is not required.

The position of the holder 95 in the directions X, Y, and Z is determined such that the reference A of the liquid crystal element 43 and a reference A' of the holder 95 are aligned and contact each other, thereby aligning the effective areas 81*a* and 81*b* of the liquid crystal element 43 relative to the optical axis direction with precision.

According to the illustrative embodiment, the adhesive is applied to the adhesive application area H' of the holder 95 to which the liquid crystal element 43 is adhered.

Furthermore, the position of the liquid crystal element 43 in the directions of Y and Z, and the position of the holder 95 in the directions Y and Z directions are determined using a jig. Accordingly, positioning can be performed in the directions X, Y, and Z, and therefore, the relative position of the liquid crystal element 43 and the holder 95 is maintained with precision.

In other words, the relative position of the light source unit 60 (the laser beams 71*a* and 71*b* emitted from the light source unit 60 entering the liquid crystal element 43) and the liquid crystal element 43 (and the effective areas 81*a* and 81*b*) is maintained with precision.

It is to be noted that, in general, a crystal axis direction (rubbing direction) of liquid crystal material of the liquid crystal element is preset on the liquid crystal element. The crystal axis direction and an oscillation direction of direct polarized light of the incident beam need to be aligned at a predetermined angle, for example, parallel. In view of this, an amount of inclination around the X-axis of the liquid crystal element needs to be reduced. Thus, the glass substrate of the liquid crystal and the holder need to be positioned using the jig.

Next, a description is provided of a fixing method of the liquid crystal element using an adhesive agent.

Typically, the liquid crystal layer having a thickness ranging from a few micrometers [μm] to several tens of micrometers [μm] is sandwiched between two glass substrates. The edges of the glass substrates are sealed with a sealing member. This structure is a so-called "cell structure". When the liquid crystal element is held by or fixed to a holder or the like, a spring or the like is used to press the edges of the glass substrates, causing the glass substrates to deform resulting in partial degradation of parallelism of the thickness of the liquid crystal layer.

Ultimately, the wavefront aberration of the transmitted optical beam is degraded.

Figure 12:
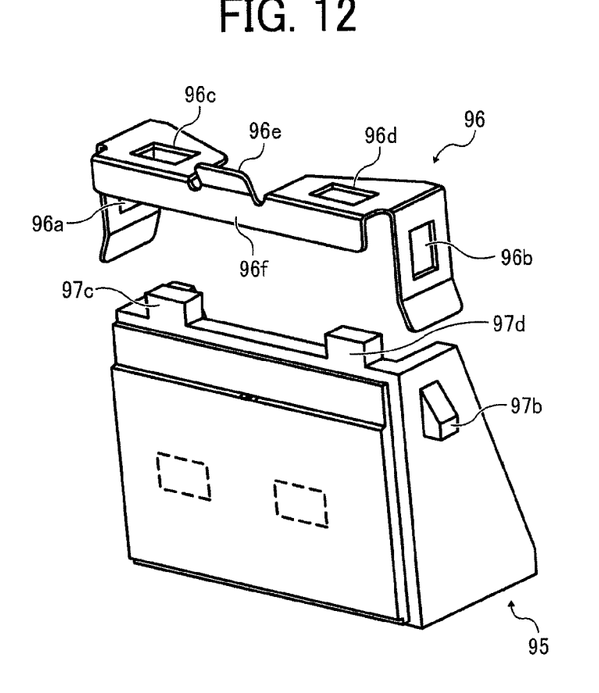
FIG. 12 is an enlarged perspective schematic view of a holding mechanism for the liquid crystal element of the optical scanning device according to another illustrative embodiment.
Figure 13:
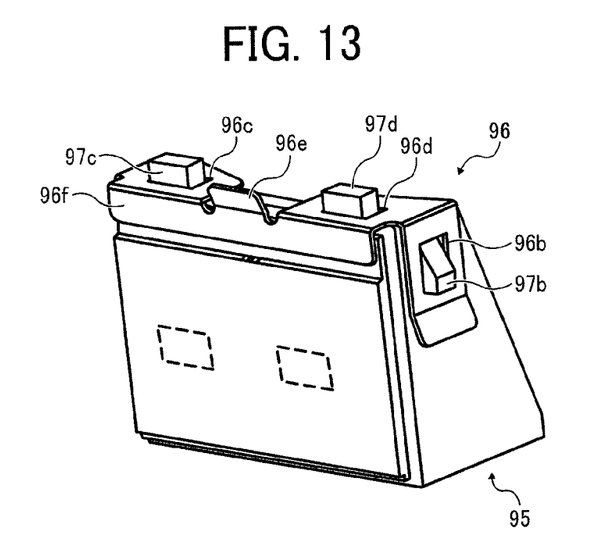
FIG. 13 is a perspective schematic view of the holding mechanism of FIG. 12 after assembly.

In view of the above, the illustrative embodiments illustrated in FIGS. 6, 12, and 13 are employed.

Figure 11:
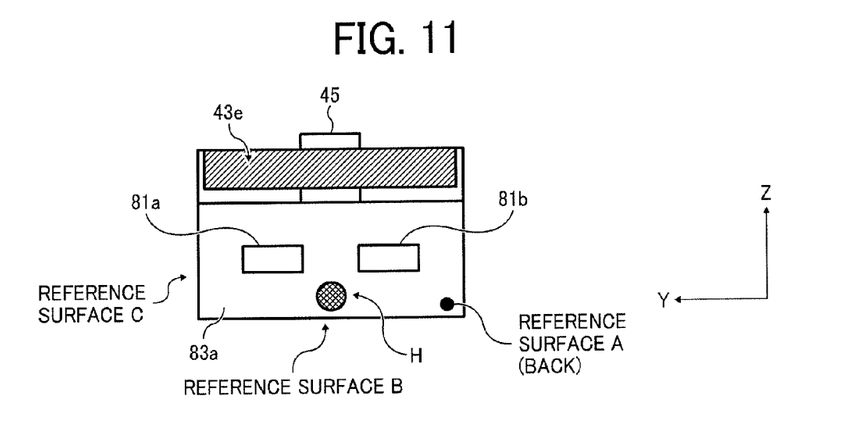
FIG. 11 is a front schematic view of a liquid crystal element according to another illustrative embodiment of the present invention.

The size of the glass substrate 83*b* having the reference surface A is configured larger than the other glass substrate 83*a*, thereby forming an area where the glass substrate 83*a* does not overlap with the glass substrate 83b. As illustrated in FIG. 5 and FIG. 11, the areas of the glass substrate 83b that do not overlap with the glass substrate 83a are referred to as stopper regulation areas 43c, 43d, and 43e (shown in FIG. 11). At the stopper regulation areas 43c, 43d, and 43e, and the adhesive application area H adhered to the holder 95, the liquid crystal element 43 is fixed to the holder 95.

With this configuration, the glass substrates 83b and 83a sandwich the liquid crystal layer therebetween forming the liquid crystal element 43, and the liquid crystal element 43 is fixed to the holder 95 without pressing directly the liquid crystal layer sealed with the sealing member.

According to the illustrative embodiment, the holder 95 includes stopper portions 95a and 95b. The liquid crystal element 43 is disposed between the stopper portions 95a and 95b, and the reference surface A' of the holder 95 not too tightly. In other words, the stopper portions 95a and 95b are prevented from pressing excessively the stopper regulation areas 43c and 43d of the glass substrate 83a so as to facilitate assembly of the liquid crystal element 43 relative to the holder 95. The stopper portions 95a and 95b of the holder 95 or a stopper member 96 of a later-described illustrative embodiment prevent the liquid crystal element 43 from falling off when there is an abnormal stress on the FPC 45 during assembly of the liquid crystal element 43.

It is to be noted that the adhesive agent is applied at one place, that is, the adhesive application area H' of the holder 95. Alternatively, the adhesive agent is applied at the adhesive application area H of the liquid crystal element 43. Four sides of the glass substrate 83a are not regulated by the holder 95, thereby allowing expansion or contraction of the glass substrate due to changes in the temperature. With this configuration, deformation of the glass substrate that causes lens power is prevented, and thus fluctuation of the beam waist position and degradation of the beam spot diameter can be prevented.

With reference to FIGS. 12 and 13, a description is provided of another illustrative embodiment of the present invention. FIG. 12 is an enlarged perspective schematic view of a holding mechanism for the liquid crystal element of the optical scanning device according to another illustrative embodiment. FIG. 13 is a perspective schematic view of the holding mechanism of FIG. 12 after assembly.

As illustrated in FIG. 12, the holder 95 includes the stopper member 96 mounted substantially from the top of the holder 95. The stopper member 96 includes openings 96a through 96d that are fitted with projections 97a through 97d, respectively, to engage the stopper member 96 with the holder 95. The stopper member 96 includes also a tab 96e to facilitate handling of the stopper member 96. The tab 96e is provided at a position at which the tab 96e comes outside the FPC 45 when the stopper member 96 is mounted on the holder 95. In FIG. 12, the tab 96e is provided substantially at the center between the openings 96c and 96d. It is to be noted that broken-line squares in FIGS. 12 and 13 refer to places corresponding to the apertures hidden behind the liquid crystal element.

Substantially below the tab 96e, a holding potion 96f is continuously formed. The holding portion 96f supports the stopper regulation area 43e illustrated in FIG. 11. With this configuration, the liquid crystal element 43 can be held more securely relative to the holder 95.

It is to be noted that the configuration of the surface of the holder 95 at which the liquid crystal element 43 is installed is similar to, if not the same as the foregoing embodiments illustrated in FIGS. 5 and 6, except the stopper member 96. Therefore, the description thereof is omitted in FIGS. 12 and 13.

Next, a description is provided of the liquid crystal element operable by electric signals.

In general, the FPC (Flexible Printed Circuit) is often used to input electric signals to drive the liquid crystal element. The FPC is mounted at a position at which the two glass substrates do not overlap as disclosed in JP 2002-258314-A, for example (the disclosure thereof being incorporated herein by reference).

As described above, the effective areas 81a and 81b of the liquid crystal element 43 are independently driven by the electric signals input from the external device through the FPC 45. In the effective areas 81a and 81b, the phase of the incident laser beams 71a and 71b is modulated. Accordingly, the light paths of the laser beams 71a and 71b can be deflected.

When changing the density of an image, for example, from 600 dpi to 1200 dpi, the liquid crystal element 43 is driven to switch the pitch of the laser beams projected from the laser diodes 61a and 61b on the photoreceptor drum 3 in the sub-scanning direction. For example, when writing at 600 dpi, the base member 63 is rotatably adjusted such that the pitch of the laser beams projected from the laser diodes 61a and 61b is 42.3 µm on the photoreceptor drum 3 in the sub-scanning direction.

When a user wishes to output an image at 1200 dpi, the user may instruct on a control screen for the density of 1200 dpi, for example, and the liquid crystal element 43 receives the electric signals from the external device, thereby performing the phase modulation and deflection. Accordingly, the pitch of the laser beams projected from the laser diodes 61a and 61b onto the photoreceptor drum 3 in the sub-scanning direction is changed to 21.2 µm.

Figure 7:
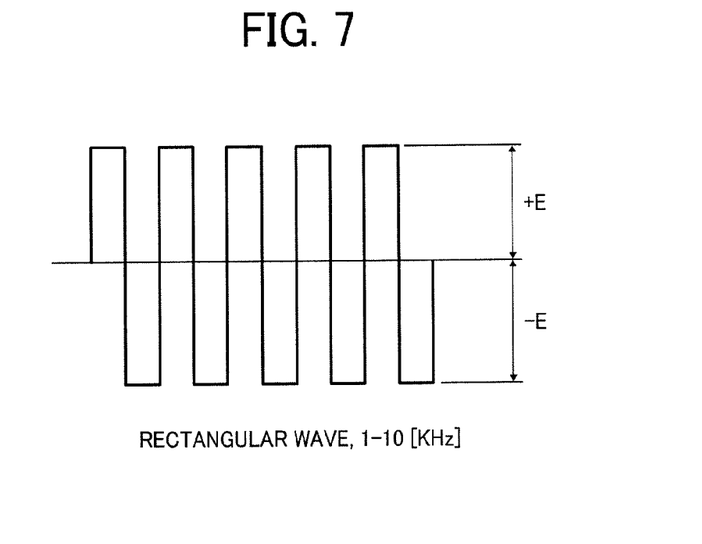
FIG. 7 is a schematic diagram illustrating one example of an electric signal for driving the liquid crystal element.
Figure 8:
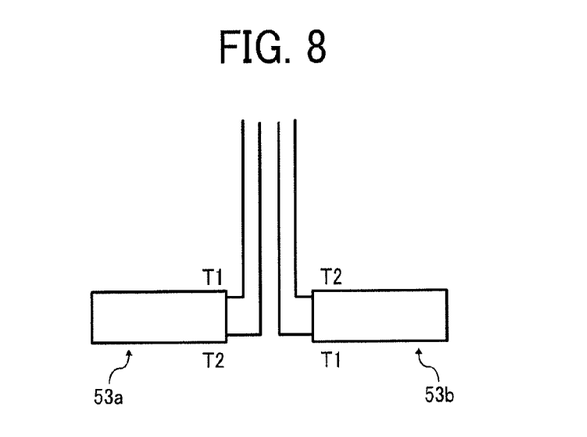
FIG. 8 is a schematic diagram illustrating an example of an electrode pattern for driving the liquid crystal element.

As illustrated in FIGS. 7 and 8, as the electric signals for driving the liquid crystal element, an alternating voltage in a range of approximately 1 to 10 KHz is input in input terminals T1 and T2. An amount of deflection after passing through the liquid crystal is proportional to a potential difference between the input terminals T1 and T2.

Figure 9:
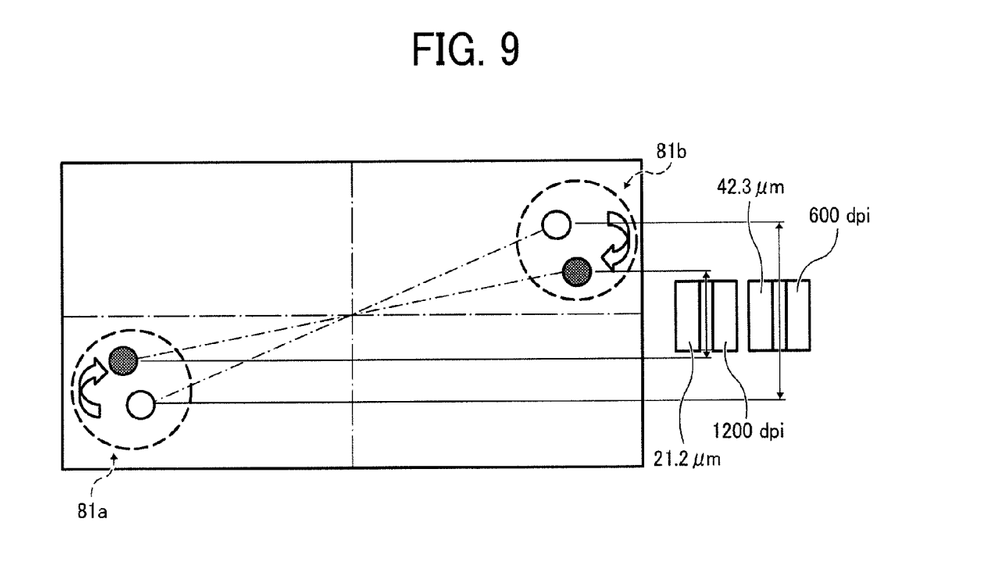
FIG. 9 is a schematic diagram illustrating an example of changing a density of an image.

As illustrated in FIG. 9, the direction of deflection during operation of the liquid crystal element can be changed by switching the wiring pattern of the input terminals T1 and T2 at the effective areas 81a and 81b. When switching the image density between 600 dpi and 1200 dpi, an amount of deflection is less if the light paths are deflected to directions opposite to one another at the effective areas 81a and 81b. When the amount of deflection is less, it is possible to make the liquid crystal layer thin. It is desirable to make the liquid crystal layer as thin as possible because deformation of the glass substrate occurs due to thermal expansion of the liquid crystal if the liquid crystal layer is thick.

A pulse signal illustrated in FIG. 7 employed in the foregoing illustrative embodiments is generated by a clock signal that drives a polygon motor in the image forming apparatus. With this configuration, the liquid crystal element is driven when the polygon motor is driven so that no additional oscillator is needed, thereby preventing an increase in cost.

According to the illustrative embodiments of the present invention, the size of the glass substrates that sandwich the liquid crystal layer is different from one another. The larger glass substrate is fixed to the holder. With this configuration, the liquid crystal element is reliably fixed without overstressing the liquid crystal layer between the glass substrates sealed by the sealing member. The effective areas of the liquid crystal element is aligned in the direction of the optical axis.

Furthermore, because the size of one of the glass substrates is larger than the other, the positioning accuracy can be enhanced.

Furthermore, the adhesive application area which is adhered to the liquid crystal element is provided to the holder at a place substantially near the center of one side of the glass substrate. The stopper regulation areas are provided to the larger glass substrate to regulate the position of the glass substrate relative to the holder. With this configuration, the holder does not hinder the glass substrates from thermally expanding and contracting. The holder prevents generation of lens power due to deformation of the glass substrates. Alternatively, the adhesive application area can be provided to the liquid crystal element.

According to the illustrative embodiments, the liquid crystal element is driven by the electric signal, thereby enabling modulation of the phase of the incident laser beam and a change in the position of the scan line or a sub-scan beam pitch. The electric signal for driving the liquid crystal element is a pulse signal generated by the same clock signal for driving the polygon motor. With this configuration, it is possible to generate the pulse signal with a simple configuration using the existing oscillator in the optical writing device.

According to the illustrative embodiment, the holder that holds the liquid crystal element between the glass substrates includes the apertures that shape the light beams entering the liquid crystal or projected through the liquid crystal element into a desired shape. Accordingly, the effective areas of the liquid crystal and the apertures can be reliably aligned. The holder including the apertures and the optical housing constitute independent members, facilitating assembly.

When the optical scanning device of the present invention is used in an exposure device of an image forming apparatus, the image forming apparatus can realize high imaging quality.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanning device comprising:
a light source to project a light beam;
an optical system; and
a housing, including a holder, to enclose the optical system, the optical system including a liquid crystal element held by the housing via the holder, to modulate a phase of the light beam projected from the light source against a scanned surface,
the liquid crystal element including:
a first substantially transparent substrate having a first surface;
a second substantially transparent substrate positioned in the holder and having a second surface which opposes the first surface, wherein the second surface has a total area which is larger than a total area of the first surface;
the second surface further comprising an overlapping area which overlaps with the first surface, and a non-overlapping area that does not overlap with the first surface;
a liquid crystal layer disposed between the first surface and the second surface in the overlapping area;
a sealing member disposed between the first surface and the second surface in the overlapping area to seal the liquid crystal layer between the first and second surfaces;
wherein the second substantially transparent substrate is positioned relative to the holder at the non-overlapping area.

2. The optical scanning device according to claim 1, wherein the holder includes a contact surface that contacts the non-overlapping area of the second substantially transparent substrate of the liquid crystal element to align the liquid crystal element in an optical axis direction of the light beam projected from the light source.

3. The optical scanning device according to claim 1, wherein the holder includes:
an adhesive application area corresponding to the center of the liquid crystal element in the longitudinal direction thereof, at which an adhesive is applied to adhere the liquid crystal element to the holder; and
a stopper portion to retain the liquid crystal element in the holder.

4. The optical scanning device according to claim 1, wherein the holder includes:
an adhesive application area at which an adhesive is applied to adhere the liquid crystal element to the holder, the adhesive application area corresponding to the center of the liquid crystal element in the longitudinal direction thereof;
a plurality of projections on surfaces including side surfaces and a top surface except the surface on which the liquid crystal element is adhered; and
a stopper member including a plurality of openings that accommodate the projections provided on the top surface of the holder to retain the liquid crystal element in the holder.

5. The optical scanning device according to claim 1, wherein the liquid crystal element includes at least one of a harness and a terminal including a flexible printed circuit (FPC), which receives an electric signal from an external device to modulate the phase of an incident light beam.

6. The optical scanning device according to claim 5, wherein the electric signal is a pulse signal generated by a clock signal for driving a polygon motor.

7. The optical scanning device according to claim 1, wherein the holder includes an opening to shape a cross-section of a light beam entering or exiting the liquid crystal element to a desired shape.

8. The optical scanning device according to claim 7, wherein the holder and the housing are constituted as independent members.

9. An image forming apparatus, comprising:
an image bearing member to bear an electrostatic latent image on a surface thereof;

a developing device to develop the electrostatic latent image formed on the image bearing member using toner to form a toner image;

a transfer device to transfer the toner image onto a recording medium;

a fixing device to fix the toner image; and an optical scanning device that exposes the image bearing member to form the electrostatic latent image thereon, the optical scanning device including:

a light source to project a light beam;

an optical system; and a housing, including a holder, to enclose the optical system, the optical system including a liquid crystal element held by the housing via the holder, to modulate a phase of the light beam projected from the light source against a scanned surface, the liquid crystal element including:

a first substantially transparent substrate having a first surface;

a second substantially transparent substrate positioned in the holder and having a second surface which opposes the first surface, wherein the second surface has a total area which is larger than a total area of the first surface;

the second surface further comprising an overlapping area which overlaps with the first surface, and a non-overlapping area that does not overlap with the first surface;

a liquid crystal layer disposed between the first surface and the second surface in the overlapping area;

a sealing member disposed between the first surface and the second surface in the overlapping area to seal the liquid crystal layer between the first and second surfaces;

wherein the second substantially transparent substrate is positioned relative to the holder at the non-overlapping area.

* * * * *